US008466986B2

(12) United States Patent
Takeuchi et al.

(10) Patent No.: US 8,466,986 B2
(45) Date of Patent: Jun. 18, 2013

(54) IMAGE CAPTURING APPARATUS, IMAGE CAPTURING CONTROL METHOD, AND STORAGE MEDIUM STORING PROGRAM FOR IMAGE CAPTURING

(75) Inventors: Takeharu Takeuchi, Fussa (JP); Kazuya Nara, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/300,780

(22) Filed: Nov. 21, 2011

(65) Prior Publication Data

US 2012/0133795 A1     May 31, 2012

(30) Foreign Application Priority Data

Nov. 25, 2010   (JP) ................................ 2010-262223

(51) Int. Cl.
*H04N 5/76*     (2006.01)
*H04N 5/225*     (2006.01)
*H04N 7/12*     (2006.01)
*G06K 9/36*     (2006.01)

(52) U.S. Cl.
USPC ............... 348/231.99; 348/231.3; 348/231.4; 348/220.1; 348/384.1; 375/240.25; 375/240.26; 382/232; 382/233; 382/236; 382/239

(58) Field of Classification Search
USPC ................... 348/231.99, 220.1, 231.4, 231.3, 348/384.1, 387.1, 568, 14.13; 375/240.01–240.29; 382/232, 233, 235, 166, 382/243, 236
See application file for complete search history.

(56) References Cited

U.S. PATENT DOCUMENTS

| 5,606,371 | A | * | 2/1997 | Klein Gunnewiek et al. | 375/240.03 |
| 5,617,142 | A | * | 4/1997 | Hamilton | 375/240.03 |
| 6,654,421 | B2 | * | 11/2003 | Hanamura et al. | 375/240.26 |
| 7,899,261 | B2 | | 3/2011 | Takahashi | |

FOREIGN PATENT DOCUMENTS

| JP | 4-114581 | 4/1992 |
| JP | 5-030471 | 2/1993 |
| JP | 2001-036904 | 2/2001 |
| JP | 2004-64559 A | 2/2004 |
| JP | 2004-173005 | 6/2004 |
| JP | 2005-137023 | 5/2005 |
| JP | 2007-020032 A | 1/2007 |
| JP | 2007-142683 | 6/2007 |
| JP | 2008-271431 | 11/2008 |
| JP | 2009-159303 | 7/2009 |

OTHER PUBLICATIONS

Korean Office Action dated Feb. 26, 2013 (and English translation thereof) in counterpart Korean Application No. 10-2011-0122727.

* cited by examiner

*Primary Examiner* — Nhan T Tran
*Assistant Examiner* — Marly Camargo
(74) *Attorney, Agent, or Firm* — Holtz, Holtz, Goodman & Chick, P.C.

(57) ABSTRACT

An image capturing control method includes obtaining temporally-continued image data items while driving the image capturing unit at one of predetermined continuous capturing speeds, temporarily holding the obtained image data items, sequentially compressing the temporarily held image data items at a predetermined compression ratio, determining whether or not the compressed image data items falls within a predetermined data volume, performing control of recompressing the image data items at a compression ratio higher than the predetermined compression ratio, when it is determined that compressed image data items does not fall within the predetermined data volume, and setting the number of recompression for each of the image data items according to a continuous capturing speed of the driven image capturing unit.

5 Claims, 4 Drawing Sheets

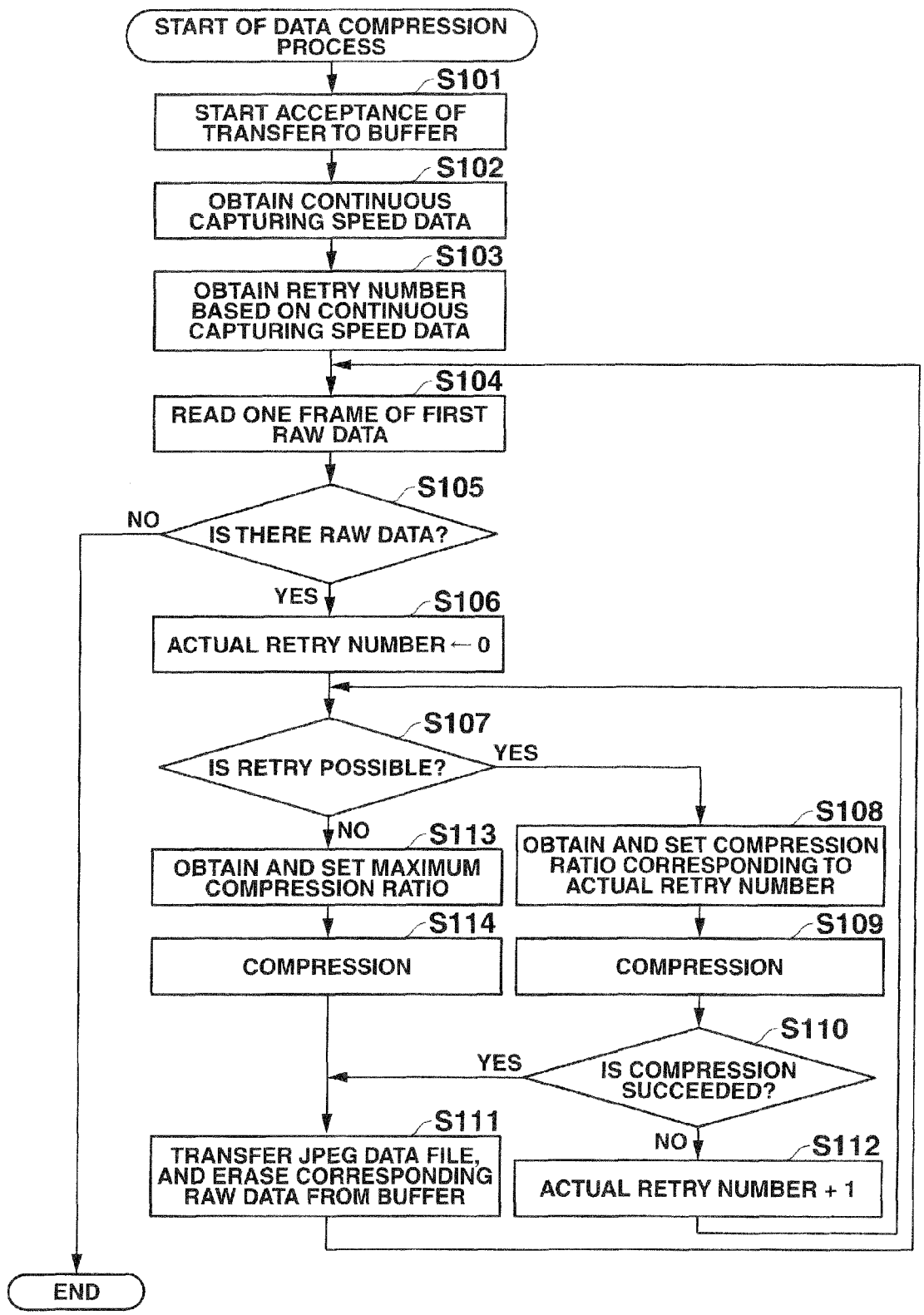

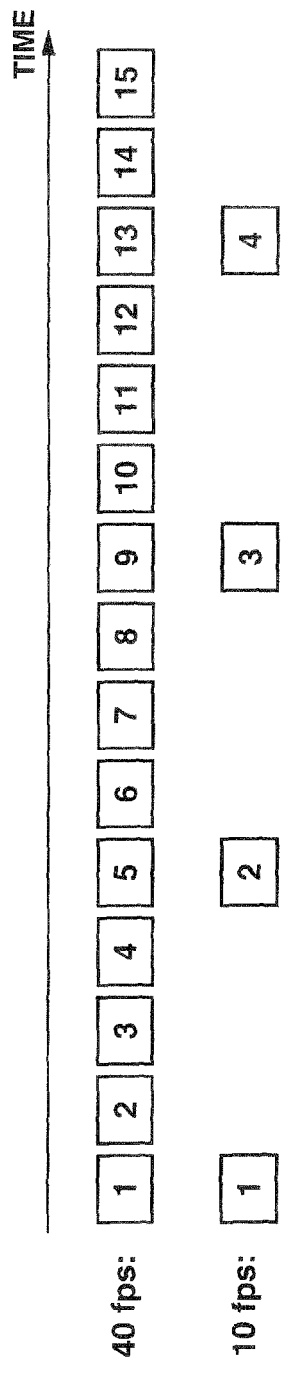

IMAGE CAPTURING APPARATUS, IMAGE CAPTURING CONTROL METHOD, AND STORAGE MEDIUM STORING PROGRAM FOR IMAGE CAPTURING

CROSS-REFERENCE TO RELATED APPLICATIONS

This application is based upon and claims the benefit of priority from prior Japanese Patent Application No. 2010-262223, filed Nov. 25, 2010, the entire contents of which are incorporated herein by reference.

BACKGROUND OF THE INVENTION

1. Field of the Invention

The present invention relates to an image capturing apparatus having functions of continuous capturing and data compression, an image capturing control method, and a memory medium storing a program.

2. Description of the Related Art

A digital camera capable of setting a wide range of continuous capturing speed has recently been commercialized and become popular. In such kind of digital camera, image data obtained upon capturing is held anytime in a buffer memory, and image data is sequentially read from a buffer memory, compressed, and converted into a file based on Joint Photographic Experts Group (JPEG) or other standards, and recorded in a memory card or a memory medium.

For compression of image data, it is necessary to set the volume of compressed data under a predetermined value. If the compressed data volume is greater than a predetermined value, a process of retrying image data compression at a higher compression ratio is indispensable.

In such a field, a technology to estimate compression the volume of compressed image data without lowering a continuous capturing speed has been disclosed in Jpn. Pat. Appln. KOKAI Publication No. 2004-064559, for example.

In the technology disclosed in this document, an image area used as a reference for estimating data volume is changed based on the total of time required to estimate data volume and time required to compress and convert image data into a data file.

Thus, as a continuous capturing speed is increased, an image area used as a reference for estimation is sequentially reduced, and the reliability of data volume estimation is decreased. Especially, at a higher continuous capturing speed, the volume of compressed data is estimated from a very small image area.

Therefore, actual compressed data volume is different from estimation, and may exceed a preset data volume, in such a case, a data compression process is retried, and the time required for data compression is consequently increased furthermore.

Generally, at a nigh continuous capturing speed, image data is sequentially obtained upon capturing and stored in a buffer memory, but compression of the stored image data is delayed, and a data compression process is continued even after the end of capturing. In such a case, a camera is under data processing unable to go to the next capturing, and increases the possibility of failing to release a shutter at a right moment.

BRIEF SUMMARY OF THE INVENTION

Accordingly, it is an object of the invention to provide an image capturing apparatus, an image capturing control method, and a storage medium storing a program, capable of satisfying both continuous capturing speed and picture quality.

According to one aspect of the present invention, there is provided an image capturing apparatus comprising: an image capturing unit; a data obtaining unit configured to obtain temporally-continued image data items while driving the image capturing unit at one of predetermined continuous capturing speeds; a first holding unit configured to temporarily hold the image data items obtained by the data obtaining unit; a compression unit configured to sequentially compress the image data items temporarily held in the first holding unit at a predetermined compression ratio; a determination unit configured to determine whether or not the image data items compressed by the compression unit falls within a predetermined data volume; a first control unit configured to control the compression unit to recompress the image data items at a compression ratio higher than the predetermined compression ratio, when the determination unit determines that compressed image data items does not fall within the predetermined data volume; and a retry number setting unit configured to set the number of recompression for each of the image data items according to a continuous capturing speed of the image capturing unit driven by the data obtaining unit.

According to another aspect of the present invention, there is provided an image capturing control method comprising: obtaining temporally-continued image data items while driving the image capturing unit at one of predetermined continuous capturing speeds; temporarily holding the obtained image data items; sequentially compressing the temporarily held image data items at a predetermined compression ratio; determining whether or not the compressed image items falls within a predetermined data volume; performing control of recompressing the image data items at a compression ratio higher than the predetermined compression ratio, when it is determined that compressed image data items does not fall within the predetermined data volume; and setting the number of recompression for each of the image data items according to a continuous capturing speed of the driven image capturing unit.

According to still another aspect of the present invention, there is provided a non-transitory computer readable storage medium having program code stored thereon for controlling an apparatus equipped with an image capturing unit, the program code comprising: temporarily holding the obtained image data items; sequentially compressing the temporarily held image data items at a predetermined compression ratio; determining whether or not the compressed image data items falls within a predetermined data volume; performing control of recompressing the image data items at a compression ratio higher than the predetermined compression ratio, when it is determined that compressed image data items does not fall within the predetermined data volume; and setting the number of recompression for each of the image data items according to a continuous capturing speed of the driven image capturing unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a flowchart showing operation steps related to display of a live-view image under still image capturing mode according to the same embodiment;

FIG. 3 is a diagram showing timing of image data output from a CMOS image sensor according to the same embodiment;

DETAILED DESCRIPTION OF THE INVENTION

An embodiment applied to a digital camera will be explained hereinafter with reference to the accompanying drawings.

Figure 1:
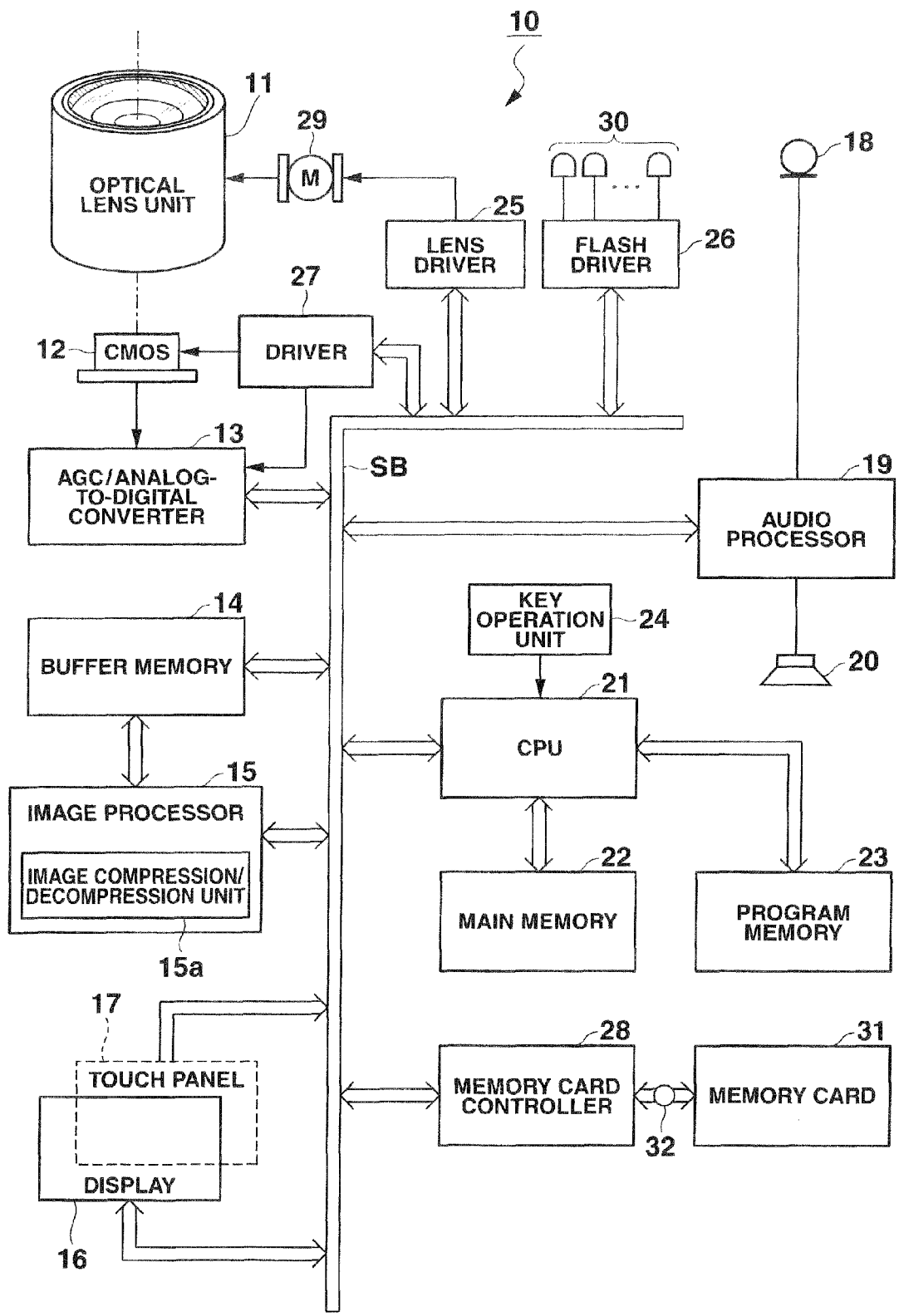
FIG. 1 is a block diagram showing a configuration of a functional circuit of a digital camera according to an embodiment.

FIG. 1 shows a circuit configuration of a digital camera 10 according to the embodiment. In the drawing, an optical image of an object is applied to and imaged on an imaging area of a solid-state image sensor, for example, a CMOS image sensor 12, through an optical lens unit 11 arranged on the front of a camera case.

In a monitoring state called live-view image display, an image signal obtained through the image capturing by the CMOS image sensor 12 is sent to an AGC/analog-to-digital converter 13, and digitized by correlative square sampling, automatic gain adjustment, and analog-to-digital conversion. The digitized image data is held in a buffer memory 14 through a system bus SB.

The image data held in the buffer memory 14 is appropriately processed by an image processor 15 anytime at needs. The image processor 15 converts the image data (RAW data) held in the buffer memory 14, conforming to a Bayer-array color filter configuration provided in the CMOS image sensor 12, into a luminance/color-difference (YUV) type image data, by digital development, specifically, de-mosaic processing such as pixel interpolation, gamma correction, and matrix calculation.

The image processor 15 produces image data for display with extremely decreased pixels and gradation bits, from the developed image data, and sends the data to a display 16 through a system bus SB. The display 16 displays a live-view image based on the image data.

The display 16 includes a color liquid crystal panel with a backlight, and its controller. A touch panel 17 with a transparent conductive film is formed in the upper screen part of the display 16 as one piece.

When a user operates the touch panel 17 by touching the surface with a finger, the touch panel 17 calculates coordinates of the touched position, and sends a calculated coordinate signal to a CPU 21 through the system bus SB.

As in the optical lens unit 11, the front of the camera case is provided with a microphone 18, and a sound toward an object enters the microphone. The microphone 18 converts the entered sound into an electric signal, and sends it to an audio processor 19.

The audio processor 19 digitizes an audio signal entering the microphone 18 during recording sound itself, capturing a still image with a sound, and capturing a moving picture.

Further, the audio processor 19 detects a sound pressure level of digitized audio data, generates an audio data file by compressing the audio data into a predetermined data file format, for example, Moving Picture Experts Group-4 Advanced Audio Coding (AAC), and sends the file to a recording medium.

In addition, the audio processor 19 is provided with a sound source circuit such as a PCM sound source, and converts an audio data file sent during playback of sound into analog data by decompressing the data, and sounds the data loudly by driving a speaker 20 provided on the back of the case of the digital camera 10.

The CPU 21 integrally controls the above circuit. The CPU 21 is directly connected to a main memory 22, and a program memory 23. The main memory 22 includes SRAM, for example, and functions as a work memory. The program memory 23 includes an electrically rewritable nonvolatile memory, for example, a flash memory, and fixedly stores an operation program and data including operations during continuous capturing.

The CPU 21 reads necessary program and data from the program memory 23, develops and stores them appropriately and temporarily in the main memory 22, and executes every control operation of the digital camera 10.

Further, the CPU 21 executes the control operations according to key operation. signals directly entered from a key operation unit 24, and coordinate signals entered by touching the touch panel 17.

The key operation unit 24 includes a power supply key, a shutter key, a zoom up/down key, a capturing mode key, a playback mode key, a menu key, a cursor ("↑", "→", "↓", "←") keys, a set key, a cancel key, and a display key, for example.

The CPU 21 is connected to a lens drier 25, a flash driver 26, a driver 27, and a memory card controller 28 through the system bus SB, in addition to the AGC/analog-to-digital converter 13, buffer memory 14, image processor 15, display 16, touch panel 17, and audio processor 19.

The lens driver 25 receives a control signal from the CPU 21, controls rotation of a lens DC motor (M) 29, and individually controls a part of a lens group constituting the optical lens unit 11, specifically, the positions of a zoom lens and focusing lens, and the aperture of a diaphragm blade.

At the time of capturing a still image, the flash driver 26 receives control signal from the CPU 21, and turns on an electronic flash 30 made up of white high-intensity light-emitting diodes in synchronization with the capturing timing.

The driver 27 scans the CMOS image sensor 12 based on the capturing conditions set at that time.

At the time of capturing an image by operating the shutter key of the key operation unit 24, the image processor 15 executes de-mosaic processing for the image data sent from the AGC/analog-to-digital converter 13 and held in the buffer memory 14, compresses the data to a predetermined file format, for example, discrete cosine transform (DCT) and Huffman coding in Joint Photographic Experts Group (JPEG), by an image compression/decompression unit 15a, and generates an image data file with extremely reduced data volume. The generated image data file is once held in the buffer memory 14, and then, transferred to and saved in a memory card 3 through the memory card controller 28.

The image processor 15 receives image data read from the memory card 31 through the memory card controller 28 in playback mode, through the system bus SE, holds the data in the buffer memory 14, obtains the image data of original size by the mage compression/decompression unit 15a by decompressing the data in a process reverse to recording, decreases the obtained image data volume, and displays the image data on the display 16 through the system bus SB.

The memory card controller 28 is connected to the memory card 31 through the card connector 32. The memory card 31 is detachably inserted into the digital camera 10, functions as a recording medium of the camera for recording image data, and includes a nonvolatile flash memory and a circuit for driving the memory.

Next, operations of the embodiment will be explained.

Operations described herein include processes executed by the image processor 15 to compress image data under the control of the CPU 21 in continuo capturing mode for continuously capturing temporally-continued still images. The CPU 21 reads an operation program and data held in the program memory 23, and develops them in the main memory 22, and then executes them.

An operation program and data held in the program memory 23 include a new operation program and data externally installed by connecting the digital camera 10 to a now-shown personal computer when upgrading the camera 10, or temporarily inserting the memory card 31 storing an update program into the card connector 32, in addition to those stored in the program memory 23 before shipment of the digital camera 10.

FIG. 2 shows operation steps of data compression executed by the image compression/decompression unit 15a of the image processor 15 in continuous capturing mode. For the simplicity of explanation, typical low and high continuous capturing speeds are assumed to be 10 and 40 FPS [frames per second].

When the shutter key of the key operation unit 24 is operated in continuous capturing mode, continuous capturing is started at the set speed. Then, a step of transferring RAW data obtained sequentially by the capturing to the buffer memory 14 and accepting is started (step S101).

FIG. 3 shows the timing of image data output from the CMOS image sensor 12 when the continuous capturing speeds are 40 and 10 FPS.

In the drawing, a. digit in square (n−1, 2, ... ) indicates the nth RAN data.

The image processor 15 takes data of continuous capturing speed set at that time from the CPU 21 (step S102), and then takes a maximum retry number based on the continuous capturing speed data from the CPU 21 (step S103).

In the embodiment, a maximum retry number is 3 for a continuous capturing speed of 10 FPS, and 0 for 40 FPS, for example.

The maximum retry number data is previously stored in the program memory 23 as a table together with compression ratio data described later. The CPU 21 reads, develops, and stores the data in the main memory 22 at needs.

Then, one frame of the oldest RAW data located at the beginning of the buffer memory 14 is read by (step S104).

Depending on whether or not the RAW data can be read from the buffer memory 14, whether or not a sequence of image data compressing operations is completed is determined (step S105).

When the existence of RAW data is confirmed in step S105, the image processor 15 sets an actual retry number counted inside to an initial value "0" (step S106), and determines whether or not a retry of compressing image data is possible by comparing the counted actual retry number with the retry number taken in the previous step S103 (step S107).

For example, when a continuous capturing speed is 10 FPS, a maximum retry number is 3 as described above, and an actual retry number at that time is an initial value "0", the image processor determines that a retry is possible, and takes a compression ratio corresponding to the actual retry number from the CPU (step S108).

In other words, the CPU 21 combines a continuous capturing speed and a maximum retry number, and reads a compression ratio corresponding to the actual retry number from the program memory 23. A compression ratio corresponding to an actual retry number is set higher in proportion to an actual retry number.

The image compression/decompression unit 15a of the image processor 15 executes compression of image data by converting RAW data into a JPEG file based on the set compression ratio (step S109), and re-storing the data in the buffer memory 14.

As a result, whether or not the data compression has succeeded is determined by whether or not the data volume of the re-stored JPEG data file falls within a predetermined data volume (step S110).

When the success of data compression is confirmed, the compressed JPEG data file is transferred from the buffer memory 14 to the memory card 31, recorded and saved in the memory card, and the corresponding RAW data is erased from the buffer memory 14 (step S111). This completes a sequence of processing one frame of RAW data. The operation is moved back to step S104.

If the data volume of the JPEG data file obtained in step S110 exceeds a predetermined data volume, and the data compression fails, an actual retry number is updated to +1 (step S112), the operation is moved back to step S107, and whether or not a retry of image data compression is possible is determined.

Within the retry number set as above, image data is controlled so that the data volume falls within a predetermined data volume without deteriorating picture quality, by repeating compression of image data while gradually increasing a compression ratio.

Therefore, when a retry of image data compression more than a predetermined retry number is determined to be impossible in step S107, the image processor 15 reads a maximum compression ratio ensuring predetermined data volume from the CPU 21, and sets the compression ratio (step S113).

The image compression/decompression unit 15a of the image processor 15 executes compression of image data by converting RAW data into a JPEG file based on the set compression ratio, and re-storing the data in the buffer memory 14 (step S114).

As a result, the re-stored JPEG data file is transferred from the buffer memory 14 to the memory card 31, recorded and saved in the memory card. Then, the corresponding RAW data is erased from the buffer memory 14 (step S111). This completes a sequence of processing one frame of RAW data. The operation is moved back to step S104.

Figures 4A, 4B:
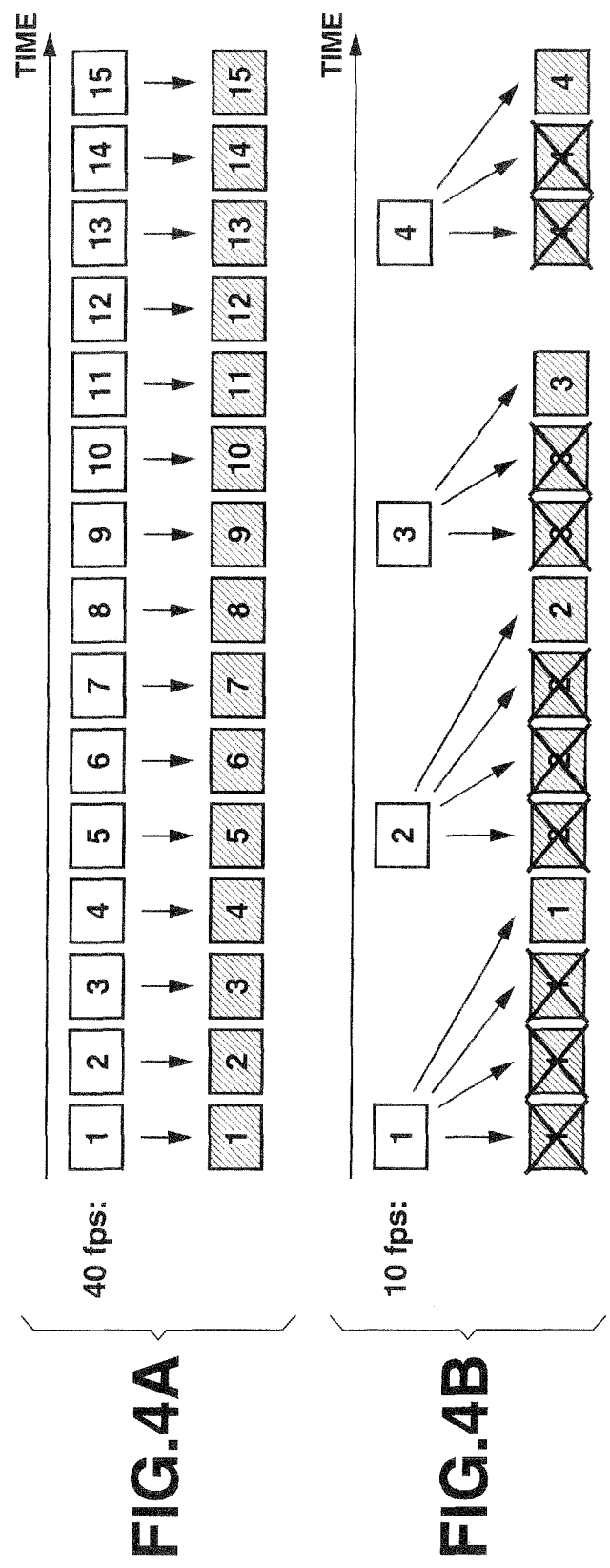
FIG. 4A is an exemplary diagram showing the output timing of image data from a CMOS image sensor according to the same embodiment (when capturing 40 FPS)
FIG. 4B is an exemplary diagram showing the output timing of image data front a CMOS image sensor according to the same embodiment (when capturing 10 FPS).

FIGS. 4A and 4B show the output timing of image data from the CMOS image sensor 12 when the continuous capturing speed is 40 (FIG. 4A) and 10 (FIG. 4B) FPS, and the data compression Is performed. thereafter.

In the drawings, a digit in a square (n=1, 2, ... ) indicates the nth JPEG data file after data compression, and a digit with "X" indicates that the compressed data file does not fall within a predetermined data volume in the buffer memory 14, and compression is retried.

When the continuous capturing speed is 40 FPS, a maximum retry number is set to "0", that is, a retry impossible, and a JPEG data file in which each image data is securely compressed by one time compression always at a maximum compression ratio is obtained.

Therefore, very little delay occurs between the operation of storing data obtained by capturing an image in the buffer memory 14, and the operation of erasing corresponding image data from the buffer memory 14 after transfer of compressed image data, and the compression can be completed almost simultaneously after a sequence of continued image capturing. As a result, it is possible to rapidly move to the next continuous capturing.

In contrast, when the continuous capturing speed is 10 FPS, by setting a retry number to "3", data compression can be retired up to three times for a totral of four attempts. Though a maximum compression ratio is used in the fourth compression, a compression ratio is gradually increased in the first three times.

Specifically, as shown in FIG. 4B, when continuous capturing is executed at the continuous capturing speed of 10 FPS, data is compressed three times at a maximum compression ratio for the images "1" and "2", but twice for the images "3" and "4", and a JPEG data file generated by compressing data at a ratio lower than a maximum compression ratio is recorded and saved.

As described above, some of RAW data contents may be compressed to a predetermined data volume even by data compression at a lower ratio with minimum deterioration in picture quality.

In the above case, also, there is very little delay between the operation of storing data obtained by capturing an image in the buffer memory 14, and the operation of erasing corresponding image data from the buffer memory 14 after transfer of compressed image data. Therefore, data compression can be completed almost simultaneously after a sequence of continued image capturing operations, and the user can rapidly move to the next continuous capturing.

If RAW data cannot be read from the buffer memory 14 in step S105, a sequence of image data compression is regarded to haven been finished, and the operation steps shown in FIG. 2 are completed.

As described hereinbefore in detail, according to the embodiment, it is possible to satisfy both continuous capturing speed and picture quality by balancing the time and compression ratio required for data compression in accordance with a set continuous capturing speed.

Further, in the embodiment, when compression of more image data is limited, data is compressed by setting a predetermined maximum compression ratio, and a data file in which data is compressed to within a predetermined data volume can be obtained.

The embodiment described herein is applied to a digital camera. The present invention is not limited to this application. The present invention may be applied to any electronic apparatus having a camera function enabling continuous capturing, such as a cell-phone terminal, portable computer, electronic book reader, and personal digital assistant (FDA).

Further, the present invention is not limited to the above applications. The present invention may be modified in various forms without departing from the essential characteristics. The functions executed in the above embodiment may be appropriately combined. The embodiment includes various phases, and the present invention may be realized in various modifications by appropriately combining the disclosed constituent elements. For example, even if some constituent elements are deleted, the present invention may be realized without the deleted elements.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An image capturing apparatus comprising:
   an image capturing unit;
   a data obtaining unit configured to obtain temporally-continued frames of image data while driving the image capturing unit at one of predetermined continuous capturing speeds;
   a holding unit configured to temporarily hold the frames of image data obtained by the data obtaining unit;
   a compression unit configured to compress the frames of image data temporarily held in the holding unit;
   a determination unit configured to determine whether or not a frame of image data compressed by the compression unit falls within a predetermined data volume;
   a retry number setting unit configured to set a retry number for each of the frames of image data according to a continuous capturing speed of the image capturing unit driven by the data obtaining unit; and
   a control unit configured to perform control to (a) read a frame of image data from the holding unit, (b) determine if retrying compression is permitted by using the retry number, (c) compress the frame of image data by the compression unit at a compression ratio that corresponds to a number of times that compression has been tried on the frame of image data if it is determined that retrying compression is permitted, (d) determine by the determination unit whether the compressed frame of image data falls within the predetermined data volume, (e) return to process (b) if the determination unit determines that the compressed frame of image data does not fall within the predetermined data volume, and (f) compress the frame of image data at a maximum compression ratio if it is determined at process (b) that retrying compression is not permitted.

2. The image capturing apparatus according to claim 1, wherein the compression ratio gradually increases as the number of times that compression has been tried on the frame of image data increases.

3. The image capturing apparatus according to claim 1, further comprising a storage control unit configured to perform control to store a compressed frame of image data when the determination unit determines that the compressed frame of image data item falls within the predetermined data volume or when the frame of image data is compressed at the maximum compression ratio.

4. An image capturing control method comprising:
   obtaining temporally-continued frames of image data while driving an image capturing unit at one of predetermined continuous capturing speeds;
   setting a retry number for each of the frames of image data according to a continuous capturing speed of the image capturing unit;
   temporarily holding the obtained frames of image data in a memory; and
   performing a compression process that comprises (a) reading a frame of image data from the memory, (b) determining if retrying compression is permitted by using the retry number, (c) compressing the frame of image data at a compression ratio that corresponds to a number of times that compression has been tried on the frame of image data if it is determined that retrying compression is permitted, (d) determining whether the compressed frame of image data falls within the predetermined data volume, (e) returning to process (b) if the compressed frame of image data does not fall within the predetermined data volume, and (f) compressing the frame of image data at a maximum compression ratio if it is determined at process (b) that retrying compression is not permitted.

5. A non-transitory computer-readable storage medium having a program stored thereon for a computer in an apparatus equipped with an image capturing unit, the program causing a computer to perform a process comprising:

obtaining temporally-continued frames of image data while driving the image capturing unit at one of predetermined continuous capturing speeds;

setting a retry number for each of the frames of image data according to a continuous capturing speed of the image capturing unit;

temporarily hold the obtained frames of image data in a memory; and performing a compression process that comprises (a) reading a frame of image data from the memory, (b) determining if retrying compression is permitted by using the retry number, (c) compressing the frame of image data at a compression ratio that corresponds to a number of times that compression has been tried on the frame of image data if it is determined that retrying compression is permitted, (d) determining whether the compressed frame of image data falls within the predetermined data volume, (e) returning to process (b) if the compressed frame of image data does not fall within the predetermined data volume, and (f) compressing the frame of image data at a maximum compression ratio if it is determined at process (b) that retrying compression is not permitted.

* * * * *